INVENTOR.
BERTRAM WALKER
BY John V. Regan
Attorney

Dec. 10, 1968 B. WALKER 3,416,003

NON-SATURATING EMITTER-COUPLED MULTI-LEVEL RTL-CIRCUIT LOGIC CIRCUIT

Filed April 5, 1965 3 Sheets-Sheet 2

INVENTOR.
BERTRAM WALKER
BY John V. Regan
Attorney

Dec. 10, 1968

B. WALKER 3,416,003

NON-SATURATING EMITTER-COUPLED MULTI-LEVEL RTL-CIRCUIT LOGIC CIRCUIT

Filed April 5, 1965

3 Sheets-Sheet 3

INVENTOR.
BERTRAM WALKER
BY John V. Regan
Attorney

United States Patent Office 3,416,003
Patented Dec. 10, 1968

3,416,003

NON-SATURATING EMITTER-COUPLED MULTI-LEVEL RTL-CIRCUIT LOGIC CIRCUIT

Bertram Walker, Willingboro, N.J., assignor to Radio Corporation of America, a corporation of Delaware Filed Apr. 5, 1965, Ser. No. 445,478
10 Claims. (Cl. 307—207)

This invention relates to logic circuits and, in particular, to improved multi-level logic circuits useful in high speed computers and in data communication equipment.

An information handling system, a digital computer for example, may comprise a large plurality of NOR gates connected in various configurations. When the NOR gates comprise transistors, the transistors generally are driven between cutoff and deep saturation in order to establish two well-defined signal levels. Such operation of a transistor results in relatively low speed operation because of minority carrier storage effects in the transistor in the saturated condition. Also, large signals are required in order to provide hard turn-on overdrive for fast turn-on of the transistors.

Other computer systems comprise combinations of AND and OR gates. When these gates comprise transistors, connected in the common emitter configuration, the aforementioned speed limitations are present due to operation thereof in deep saturation, and also require the large signal swings. Alternatively, diode gates may be used as the logic elements. However, such elements do not provide gain, In either event, an AND/OR logic system requires the inclusion of an inverter stage or stages at various points in the system.

It is one object of this invention to provide an improved multi-level logic arrangement.

It is another object of this invention to provide an improved multi-level logic arrangement which employs transistors that are never operated in deep saturation.

It is still another object of this invention to provide an improved multi-level logic arrangement in which emitter follower gates perform AND and OR logical functions, and in which a current steering logic gate is employed to produce an additional level of AND or OR logic while at the same time, providing both inverted and true outputs (essentially an AND/NAND or OR/NOR function).

It is a further object of this invention to provide an improved multi-level logic arrangement which is operative with small signal swings, for example of the order of a volt or so.

A logic arrangement embodying the invention may include one or more emitter follower gates of a first type performing one of the AND or OR logic functions and at least one emitter follower gate of a second type connected to receive the outputs of the first logic gates and to perform the other of the AND and OR logic functions. An emitter coupled current steering logic gate comprises at least two transistors having their emitter electrodes connected together and by way of a resistor to a source of fixed potential. The base of one of these transistors is connected to a source of reference potential, and the base of the other of these transistors is coupled to the output of the second emitter follower gate. By providing separate load resistors for the first and second transistors, the true and inverted outputs may be obtained. In addition, the current steering logic gate is capable of performing an additional level of logic by connecting the emitter-collector paths of other transistors in parallel with the emitter-collector path of the second transistor, and supplying inputs to the bases of these additional transistors from other sources (for example, other emitter follower logic gates).

Binary information may be represented by bivalued signals. In the arrangements to be described, a binary "1" bit is represented by a signal or level of the more positive value, and a binary "0" is represented by a signal of the less positive value. Nominally these values are zero and −1 volt, respectively, although these values may differ at different points within a logic element because of the particular circuit configuration. According to this convention, a so-called positive OR gate is one which produces a high output level or signal whenever any one of the inputs thereto corresponds to a binary "1" bit of information. A positive AND gate, on the other hand, is one which produce sa high output only when all of the inputs thereto have a value corresponding to a binary "1" bit of information. The outputs of the gates are low for all conditions other than those mentioned above.

Due to some confusion which has arisen in the past due to nonstandardized terminology in the computer art, it is well to point out that a circuit performing the so-called "positive OR" function (an OR gate for signals in which a binary "1" has the more positive value) is structurally equivalent to a so-called "negative AND gate" (a circuit which performs the AND function for binary signals in which a binary "1" has the less positive of the two bivalued levels). Also, a circuit which performs the so-called positive AND function is capable of performing the so-called negative OR function (for signals in which the binary "1" has the less positive of the two values). Accordingly, the terms to be employed hereinafter to describe the various gates will be understood to be used not in a limiting sense, but rather to describe the operation for the particular convention where the more positive level or signal is taken as representative of a binary "1" bit of information.

Figure 1:
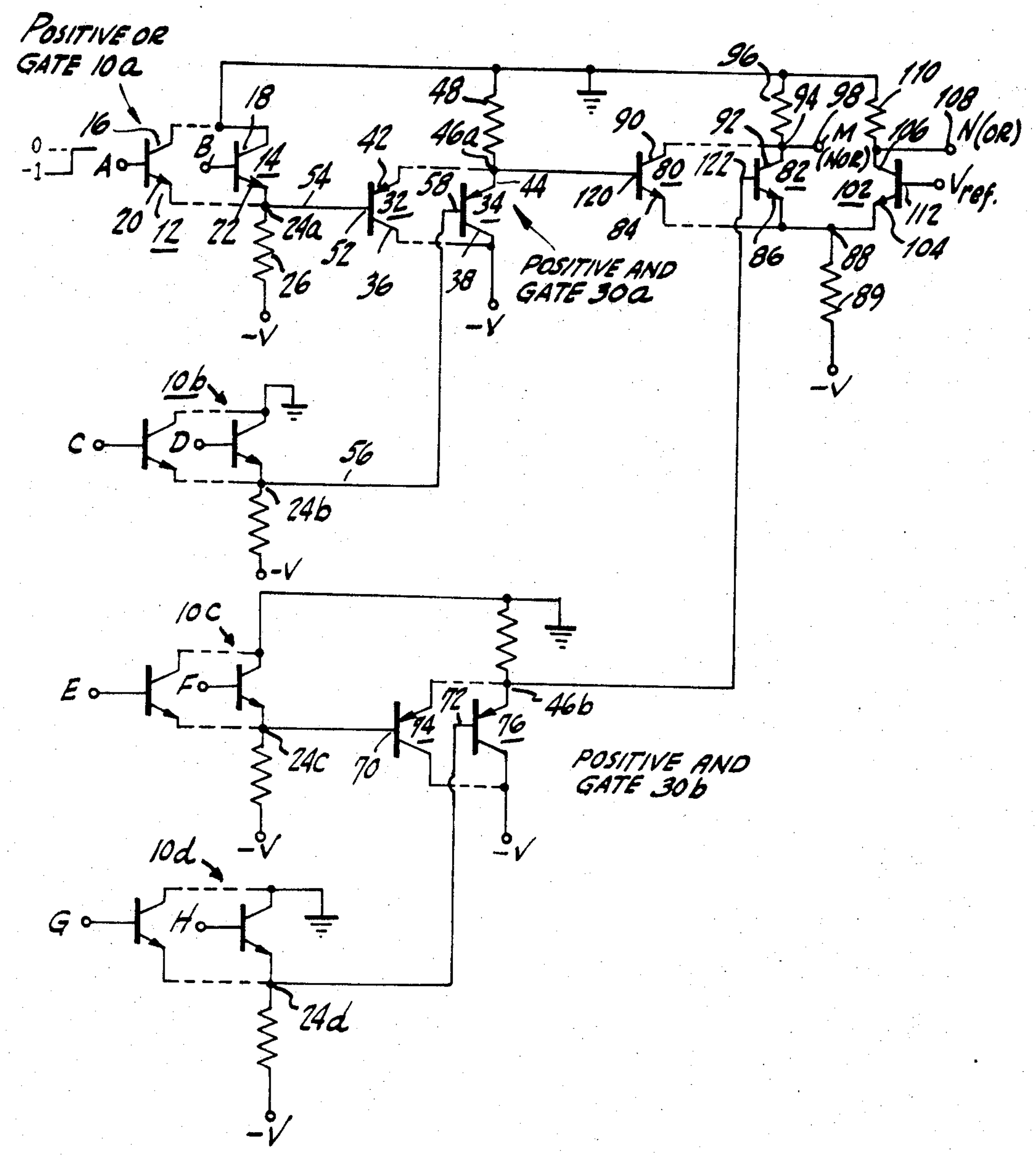
FIGURE 1 is a schematic diagram of a three level logic arrangement embodying the invention.

In FIGURE 1 there are shown, by way of example, four emitter follower gates **10*a* . . . 10*d* which are identical in circuit configuration and which perform the so-called positive OR logic function. Since each of these gates is structurally identical, a description of gate 10*a* will suffice for that of the other OR gates. Gate 10*a* includes a number of NPN transistors, two of which are shown and identified by the reference characters 12 and 14, having their collector electrodes 16 and 18, respectively, connected together and to circuit ground. The emitters 20 and 22 also are connected together and to a junction point 24*a*, whereby the emitter-collector paths of these transistors are connected in parallel, and the transistors are connected in the common, or grounded collector configuration. A common emitter resistor 26 is connected between the common emitter junction 24*a* and a point of negative potential designated "—V." This voltage may be provided, for example, by a battery of V volts (not shown) having its negative terminal connected at the bottom of resistor 26 and having its positive terminal grounded. That other transistors may also have their collector-emitter paths connected in parallel with those of transistors 12 and 14 is indicated by the dashed lines connecting the respective emitters 20, 22 and collectors 16, 18**.

A pair of positive AND gates **30*a* and 30*b* are provided for receiving various combinations of the outputs of the positive OR gates 10*a* . . . 10*d*, as will be described in greater detail hereinafter. AND gate 30*a* comprises at least two PNP transistors 32 and 34 having their collector electrodes 36 and 38 connected directly together and to the source of —V volts. The emitter electrodes 42 and 44 are connected to a junction 46*a* and by way of a common emitter resistor 48 to circuit ground. The output of the first positive OR gate 10***a* is coupled to the base 52 of transistor 32 by way of a lead 54, and the output of the second OR gate 10*b* is connected by way of a lead 56 to the base 58 of the other transistor 34 in the first positive AND gate 30*a*. In a similar manner, the outputs of the third and fourth OR gates 10*c* and 10*d* are connected respectively to the base electrodes 70 and 72 of the transistors 74 and 76, respectively, in the second positive AND gate 30*b*. As indicated by the dashed lines between the respective pairs of collectors and pairs of emitters of the AND gates 30*a* and 30*b*, other transistors (not shown) may be connected in parallel with the transistors in these AND gates, whereby more than two inputs may be supplied to each AND gate.

The third stage of the logic arrangement is a so-called emitter coupled current steering logic gate which comprises a plurality of transistors 80, 82, only two of which are shown, having their emitter-collector paths connected in parallel. The emitters 84 and 86 of these transistors are connected to a common junction 88. A common emitter resistor 89 is connected between junctions 88 and the −V volt source. The collectors 90 and 92 are connected together and to a junction 94. A collector supply resistor 96 is connected between circuit ground and the junction 94, and an output terminal 98 also is connected at the latter junction. The current steering logic gate also includes an additional transistor 102 which has its emitter electrode 104 connected to the common emitter junction 88 and which has its collector 106 connected to an output terminal 108 and, by way of a collector supply resistor 110, to circuit ground.

The base electrode 112 of transistor 102 is connected to a source of fixed reference potential "$V_{ref}$," which preferably has a value midway between the voltage values corresponding to the binary "1" and binary "0" bits of information supplied to the positive OR gates. The reason for this choice will become clearer as the discussion proceeds. The output of the first positive AND gate 30*a*, at junction 46*a*, is coupled to the base 120 of transistor 80. In like manner, the output of the second AND gate 30*b*, at junction 46*b* is coupled to the base 122 of the second transistor 82 in the current steering logic gate. It should be noted that all of the couplings between gates are D.C. connections by way of leads, which is a distinct advantage from a cost standpoint. More important, the arrangement lends itself readily to integration in monolithic form due to the absence of capacitors.

The circuit as described and illustrated may serve as the basic logic element in a digital computer. That is to say, the computer may be made up of a large number of such basic elements. It is anticipated, therefore, that either of the outputs M or N at the output junctions 98 and 108, respectively, of the current steering logic gate will selectively applied, as circumstances dictate, to the inputs of various ones of the positive OR gates in another logical element. For this reason, it is believed preferable to describe first the operation of the current steering logic gate.

The common emitter resistor 89, and the −V volt source may serve as a source of substantially constant current. This current flows through the transistor 102 whenever the voltages at the base electrodes 120, 122 of transistors 80, 82, respectively, are less positive than the voltage $V_{ref}$ applied at the base electrode 112. The output voltage N at output terminal 108 then is determined by the value of this substantially constant current and by the value of the supply resistor 110. This voltage is relatively independent of the load connected at junction 108 since, as mentioned previously, this output is supplied to one or more of the positive OR gates, which OR gates are emitter follower gates having high input impedances. At the same time, no current flows through either of the transistors 80 and 82, whereby the output voltage M at terminal 98 is at ground potential.

On the other hand, when the voltage applied at either or both of the bases 120, 122 is more positive than $V_{ref}$, transistor 102 is biased in a nonconducting condition and the substantially constant current flows through one or both of the transistors 80 and 82. The voltage at output terminal 108 then is at ground potential. The various parameters such as −V, resistor 89 and resistors 96 and 110 may be chosen so that the voltage at output terminal 108 is −1 volt when transistor 102 conducts. Likewise, the voltage at output terminal 98 is −1 volt when either or both of the transistors 80 and 82 conducts. The voltage $V_{ref}$ is chosen to be halfway between the two output levels, namely −0.5 volt.

When either or both of the inputs A and B to the first positive OR gate 10*a* is zero volts, representing a binary "1", the voltage at common emitter junction 24*a* is −0.75 volt (assuming a 0.75 volt drop across the emitter-base junction of a conducting transistor). This voltage is applied to the base 52 of transistor 32. When either or both of the C and D inputs to the second OR gate 10*b* is a binary "1", the voltage at emitter junction 24*b* is −0.75 volt. With −0.75 volt applied at the bases 52 and 58 of both transistors 32 and 34 in the first AND gate, the emitter voltage thereof, at junction 46*a*, is closed to ground potential. This voltage is more positive than $V_{ref}$, and causes transistor 80 in the current steering logic circuit to conduct and renders transistor 102 nonconducting. Output voltage M at output terminal 98 then has a value of −1 volt, and output N has a value of zero volts. These voltages have the proper value for application to a positive OR gate in another logical element. It will be noted that output M is the inverted output of the logic level appearing at the output of AND gate 30*a*, and output N is the true output.

If either of the inputs E and F to the third OR gate 10*c* and either of the inputs G and H to the fourth OR gate 10*d* have a value of zero volts (binary "1"), the voltages at both emitter junctions 24*c* and 24*d* have values of −0.75 volt. The voltage at the emitter junction 46*b* is close to ground potential. In that event, transistor 82 in the current steering logic gate is rendered conductive, output M has a value of −1 volt and output N has a value of ground potential.

If all of the inputs A . . . H are at −1 volt, representing binary "0" conditions, the voltages at all of the emitter junctions 24*a* . . . 24*d* of the various OR gates will have values of −1.75 volts. The inputs to each of the transistors 32, 34, 74, and 76 in the first and second AND gates will have values of −1.75 volts, and the resulting voltages at the emitter junctions 46*a* and 46*b* will be −1 volt. For this condition, transistor 102 in the current steering gate is rendered conductive and transistors 80 and 82 are nonconductive. Output N then has a value of −1 volt and output M has a value of ground potential. This same set of outputs obtains if inputs A and B or C and D are binary zero and inputs E and F or G and H are concurrently binary zero.

It is believed apparent from the foregoing discussion that the gates 10*a* . . . 10*d* perform the positive OR logic function, and gates 30*a* and 30*b* perform the positive AND logic function. It should be noted that the current steering logic gate, in addition to performing the inverted and true outputs of the positive AND gates 30*a* and 30*b*, also performs a level of logic in its own right. The left side of the current steering gate performs the positive OR function plus inversion, which is logically equivalent to a NOR operation. The output of the right hand transistor 102 thus is the OR function. The distinct advantage of performing logic in the inverter stage is that it is achieved at no additional stage delay, since the step of inversion is necessary in any event in an AND/OR logic scheme.

The current steering logic gate also performs another very important function in addition to that of logic and inversion. Because the currents in emitter resistors 26 and 48 will probably differ, causing differences in the base-emitter drops of the respective emitter follower gates, and because of differences in transistor characteristics in the OR and AND gates, particularly in the voltage drops across the emitter-base junctions thereof, there will probably be a shift in voltage levels. The current steering logic gate, because of its inherent characteristics, serves a level restoration function to restore the signal levels to their proper value before application to further logical elements.

Under normal operating conditions, the inputs at the bases 120 and 122 of the transistors 80 and 82 in the current steering logic gate have values of either zero volts or −1 volt. By choosing $V_{ref}$ to be midway between these values, a noise immunity of about 50% in either polarity direction is achieved.

Among other advantages of the circuit, in addition to those already listed, are that the emitter follower gates are capable of very high speed operation due to the fact that the transistors never operate in saturation. Thus, there is no minority carrier storage effect in any of these transistors and no resulting turn-off delay of the type encountered in the usual type transistor logic circuit wherein the transistors are driven between deep saturation and cut-off. Furthermore, at least one of the transistors in each of the emitter follower gates operates in the active region quiescently, whereby no hard turn-on overdrive is required to turn the transistor on rapidly. This not only reduces circuit delays, but also makes possible the use of smaller signal swings. The latter factor is of great importance in integrated circuits where power dissipation is an important factor and wherein stray capacitances must be charged and discharged over the full voltage swing. Also, the high input impedances of the emitter followers permit the use of small input currents and large fan out. Driving high impedance emitter follower OR gates from the outputs of the current steering logic gate does not greatly affect the signal levels at the outputs of the latter gate.

Figure 2:
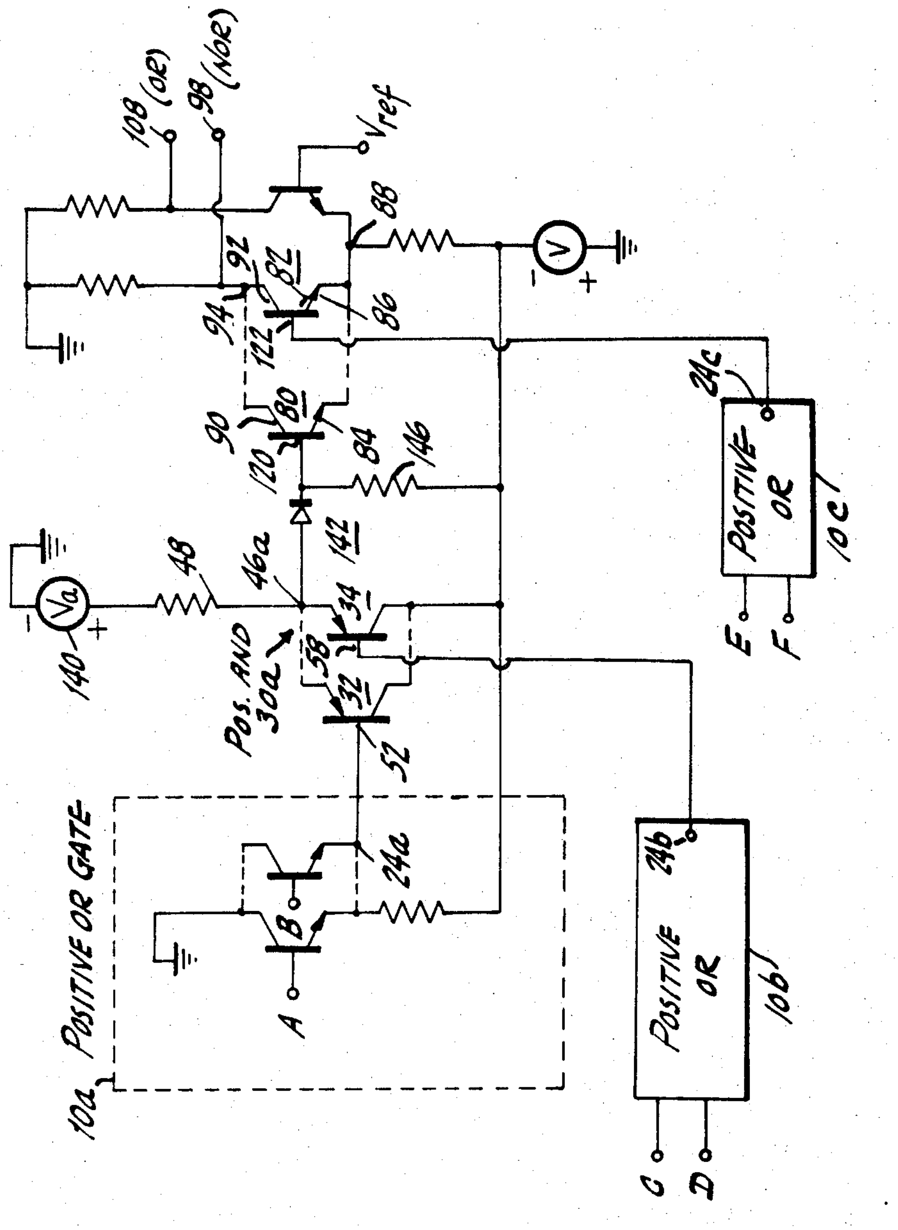
FIGURE 2 is a diagram, partly in schematic and partly in block form of another version of a three logic circuit embodying the invention.

FIGURE 2 is a diagram, partly in schematic and partly in block form, of another logic arrangement according to the invention. This arrangement is similar generally to that of FIGURE 1, except for slight differences to be noted hereinafter. As in FIGURE 1, the output at terminal 24*a* of first positive OR gate 10*a* is coupled to the base electrode 52 of the transistor 32 in the positive AND gate. Also, the output of the second OR gate 10*b*, shown in block form, is coupled to the base 58 of the other transistor 34 in the AND gate. This AND gate differs from the AND gate of FIGURE 1 in that the common emitter resistor 48 is connected to the positive terminal of a source 140 of $+V_a$ volts. Also, the common emitter junction 46*a* is connected by way of a diode 142 to the base 120 of transistor 80 in the current steering logic gate. A resistor 146 is connected between the base 120 and the source of −V volts.

These additional elements are provided, in part, for the following reasons. The voltages at the base electrodes 52 and 58 of the AND gate have values of either −0.75 volt or −1.75 volts. When both of these inputs are at −0.75 volt, the voltage at common emitter junction 46*a* is at ground potential. In the FIGURE 1 circuit, this means that little or no current flows through the emitter resistor 48 and transistors 32 and 34. More important, however, when the voltage at junction 46*a* is near ground potential, transistor 80 is driven into conduction and its collector 90 voltage becomes less positive than ground potential, whereby the transistor may operate in slight saturation. An increase in operating speed may be achieved by preventing such saturation.

In FIGURE 2, current flows through the common emitter resistor 48 of the AND gate at all times and assures sufficient current for operating the transistors 32 and/or 34 in the active region. Furthermore, the diode 142 provides an additional voltage drop between emitter junction 46*a* and the base 120 of transistor 80. For example, when the voltage at emitter junction 46*a* has its highest value, or zero volts, the voltage at base 120 then is about −0.75 volt. On the other hand, when the voltage at junction 46*a* has its least positive value, or −1 volt, the voltage at base 120 has a value of −1.75 volts. The reference voltage $V_r$ applied at the base 112 of transistor 102 is chosen to be midway between these two values, or approximately −1.25 volts.

In the operation of the FIGURE 2 circuit as thus far described, the voltage at common emitter junction 46*a* has a value of ground potential whenever the inputs A or B and C or D have values of ground potential. Due to the drop across the coupling diode 142 the voltage at base 120 then is −0.75 volt, whereby transistor 80 is not operated in saturation.

A similar input arrangement may be provided at the base 122 of transistor 82 for receiving the output of a second AND gate, such as the gate 30*b* of FIGURE 1. Alternatively, the omission of the diode at the base 122 allows the output of a positive OR gate, such as gate 10*c* to be coupled directly to the base 122, whereby a different logic arrangement is possible from that shown in FIGURE 1. That this altered arrangement is possible may be seen as follows. If it be assumed that the drop across the coupling diode 142 has the same value as the drop across a forward biased emitter-base junction of a transistor 32 or 34, these voltage drops cancel each other since the voltage drops are of opposite polarity. Under these circumstances, the output of a positive OR gate can be coupled directly to the base 122 of transistor 82 with no adverse affects on the circuit.

The dashed lines between collector electrodes 90 and 92 and between emitters 84 and 86 indicate that the collector-emitter paths of other transistors may be connected in parallel between the junction points 94 and 88. Inputs from the outputs of other positive AND gates may be coupled through diodes to the bases of different ones of these transistors (not shown). Alternatively, the outputs of positive OR gates may be connected directly to the bases of one or more such transistors.

Figure 3:
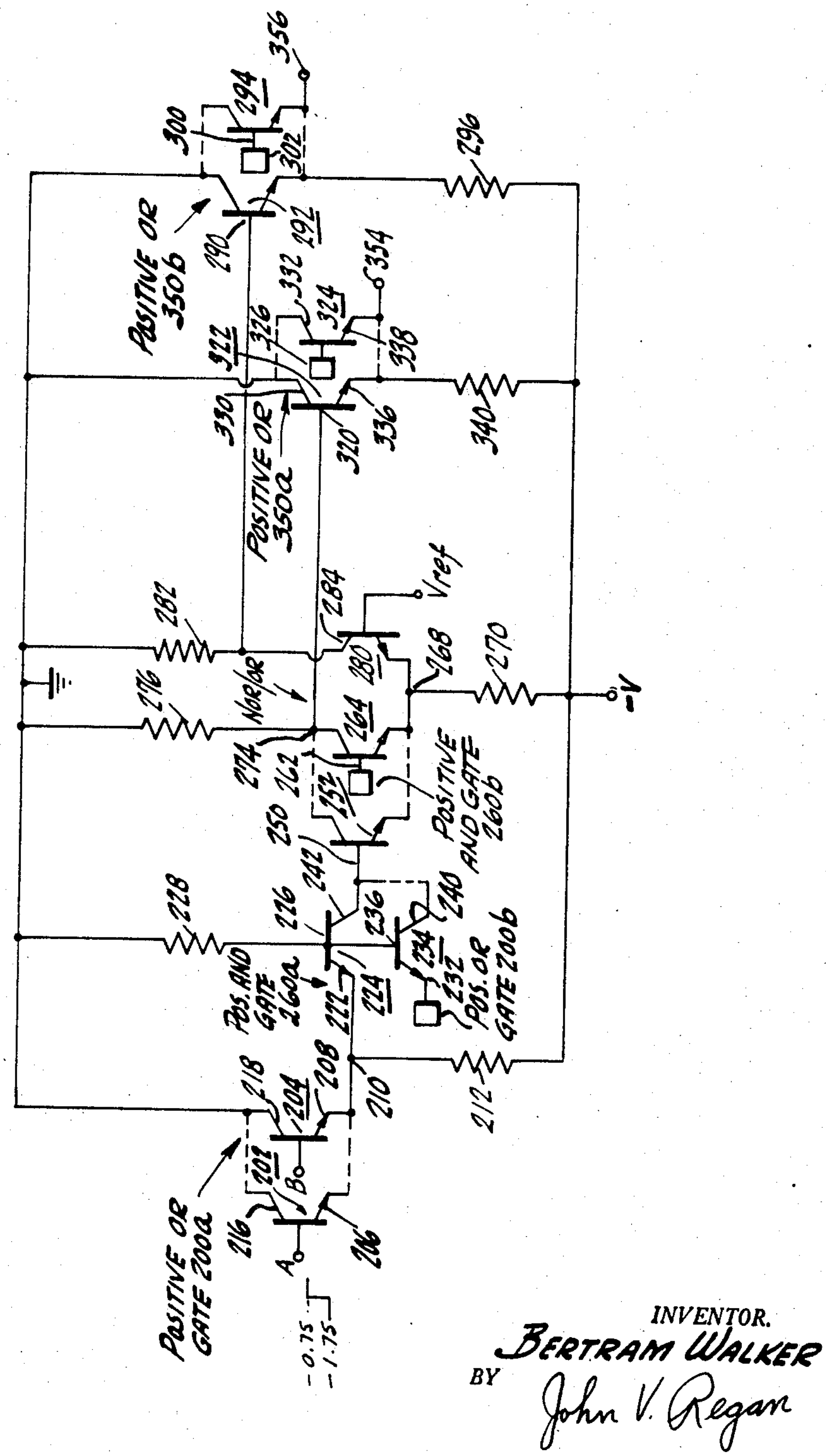
FIGURE 3 is a simplified schematic diagram embodying the invention, and in which all of the transistors are of the same conductivity type.

FIGURE 3 is a schematic diagram of a four-level logic gate in which all of the transistors are of the same conductivity type. The circuit includes a first positive OR gate 200*a* comprising two or more transistors 202, 204 having their collector-emitter paths connected in parallel. The emitters 206 and 208 are connected to a junction point 210, and by way of a common emitter resistor 212 to the −V volt source. Collectors 216 and 218 are connected together and to circuit ground.

The output of the first positive OR gate 200*a* is coupled to the emitter 222 of a transistor 224, the base 226 of which is connected to circuit ground by way of a resistor 228. Accordingly, transistor 224 is connected in the common base configuration. A second positive OR gate, represented by box 200*b* has its output coupled to the emitter 232 of another transistor 234. The base 236 of this latter transistor is connected directly to the base 226 of transistor 224, and the collectors 240 and 242 of the respective transistors are connected together and to the base 250 of one transistor 252 in a current steering logic circuit. Transistors 224 and 234 together operate to perform a positive AND logic function. A second positive AND gate, represented by box 260*b*, has its output coupled to the base 262 of a second transistor 264 in the current steering logic gate. Transistors 252 and 264 have their emitters connected to a common junction 268, and a resistor 270 is connected between that junction and the −V volt source. In addition, the collectors of transistors 252 and 264 are connected to a junction 274 by way of a supply resistor 276 to ground potential. The other section of the current steering logic gate comprises a transistor 280 having its emitter connected to the common junction 268 and having its collector returned to ground potential by way of a supply resistor 282. As in the circuits previously described, the current steering logic gate performs the NOR/OR logic function. The OR output at collector 284 is applied as input at the base 290 of a transistor 292. A second transistor 294 has its collector-emitter path in parallel with that of the transistor 292, and the collectors thereof are returned directly to ground potential. The emitters of transistors 292 and 294 are connected by way of a common emitter resistor 296 to the −V volt supply. The input at the base 300 of transistor 294, represented by a box 302, may be an output of another current steering logic gate (not shown).

In like manner, the NOR output of the current steering logic gate, at junction 274, is applied at the base 320 of a transistor 322 of a second postiive OR gate. This transistor 322 has its collector-emitter path in parallel with that of another transistor 324, the input to which may be the output of another current steering logic gate, represented by box 326. Collectors 330 and 332 are connected directly to circuit ground, and emitters 336 and 338 are connected by way of a common emitter resistor 340 to the −V volt supply.

The inputs A and B to the first positive OR gate **200*a* and the inputs to the second positive OR gate 200*b* may have levels of either −1.75 volts (corresponding to a binary "0") or −0.75 volt (corresponding to a binary "1"). When either or both of the inputs A or B to the first positive OR gate 200*a* is at −0.75 volt, the voltage at common emitter junction 210 is at approximately −1.5 volts. If the output of the other positive OR gate 200*b* also is at −1.5 volts at this time, both of the transistors 224 and 234 operate in saturation, and the voltage at the collector electrodes thereof is approximately −1.4 volts. On the other hand, if both of the inputs to one of the OR gates are at −1.75 volts (corresponding to a binary "0"), then the voltage at one of the emitters 222, 232 is at −2.5 volts. The transistor 224 or 234 associated with that emitter then is in saturation, and its collector voltage is approximately −2.4 volts. Thus, the voltage applied at the base 250 of transistor 252 has a value of either −1.4 volts or −2.4 volts, depending upon the input conditions. The reference voltage $-V_r$ at the base of transistor 280** is chosen to have a value midway between these two voltage levels, or approximately −1.9 volts. This choice assures a noise immunity of about 50 percent.

As in the previously described circuits of FIGURES 1 and 2, the component values of the current steering logic gate are selected in value so that the outputs thereof have values of either zero volts or −1 volt. In that case, if the inputs at the bases 250 and 262 of the transistors 252 and 264 are both at −2.4 volts, these transistors are nonconducting and transistor 280 is biased into conduction. The output voltage at the collector 284 of transistor 280 then is at −1 volt, and the voltage at common collector junction 274 is at ground potential.

The operation of positive OR gates **350*a* and 350*b* depend upon the inputs thereto. For example, if either or both of the inputs to the transistors 292 and 294 in OR gate 350*b* is at ground potential, the output at terminal 356 will be −0.75 volt. On the other hand, if the inputs to both of these transistors 292 and 294 are at −1 volt, the output at terminal 356 will have a value of −1.75 volts. The other positive OR gate 350*a* operates in a similar manner. It will be noted that the output voltages at terminals 354 and 356 have the correct values for application to a positive OR gate in another logical element, for example a positive OR gate such as gate 200*a***.

The circuit just described has the advantages mentioned previously for the circuits of FIGURES 1 and 2. It will be noted, however, that one or both of the transistors 224 and 234 in the positive AND gate is always in saturation. This fact does not prove deterimental to the speed of operation of the circuit for the following reason. As mentioned, one or both of these transistors is always in saturation for a given operating condition. If for one set of input conditions the transistor 224 is in saturation and the transistor 234 is not, and the input conditions so change that transistor 234 is to be driven into saturation, there is no change in voltage at the base 250 while the transistor 224 is coming out of saturation and transistor 234 is being driven into saturation. There is no set of input conditions in which both of the transistors 224 and 234 are unsaturated, so that storage delay time in the saturated transistor is not detrimental.

What is claimed is:

1. The combination comprising:

a first emitter follower logic gate including a plurality of transistors having their emitter-collector paths connected in parallel;

a second emitter follower logic gate including a plurality of transistors having their emitter-collector paths connected in parallel;

means coupling the output of the first logic gate to the input of one of the transistors of the second logic gate;

separate means for applying input signals to the inputs of the other transistors in the second logic gate;

an emitter coupled current steering logic gate including at least first and second transistors having their emitters connected together;

a resistor connected in the common emitter circuit of said first and second transistors;

means for applying a fixed potential at the base of the first transistor in the current steering logic gate;

means connecting the base of the second transistor to the output of the second logic gate; and output means connected at the collector of one of the first and second transistors.

2. The combination comprising:

a first emitter follower logic gate including a plurality of transistors having their emitter-collector paths connected in parallel;

a second emitter follower logic gate including a plurality of transistors having their emitter-collector paths connected in parallel;

means coupling the output of the first logic gate to the input of one of the transistors of the second logic gate;

separate means for applying input signals to the inputs of the other transistors in the second logic gate;

an emitter coupled current steering logic gate including at least first and second transistors having their emitters connected together;

means including a resistor connected in a circuit common to said emitters;

means at the base of the first transistor in the current steering logic gate for receiving a fixed potential;

means connecting the base of the second transistor to the output of the second logic gate;

separate impedance elements connected, respectively, in the collector circuits of the first and second transistors; and first and second output means connected at the collectors of the first and second transistors, respectively.

3. The combination comprising:

a first emitter follower logic gate including a plurality of transistors having their emitter-collector paths connected in parallel and being connected in the common collector configuration;

a second emitter follower logic gate including a plurality of transistors connected in the common collector configuration and having their emitter-collector paths connected in parallel;

means for applying input signals to the transistors in the first logic gate;

means coupling the output of the first logic gate to the input of one of the transistors in the second logic gate;

separate means for applying input signals to the inputs of others of the transistors in the second logic gate;

an emitter coupled current steering logic gate including at least first and second transistors having their emitters connected together;

means coupling the output of the second logic gate to the base of the first transistor in the current steering logic gate;

means connecting the base of the second transistor in the current steering logic gate to a point of fixed potential;

a resistor having one end connected in common to the emitters of the first and second transistors;

first and second impedance elements each having one end connected to the collector of a different one of the first and second transistors;

means for connecting a source of operating potential between the other end of said resistor on the one hand, and the other end of each one of the impedance elements on the other hand; and output means connected at the collector of at least one of the first and second transistors.

4. The combination comprising:

at least first and second emitter follower logic gates each performing the same one of the AND and OR logic functions, each of said gates including a plurality of transistors of the same conductivity type connected in the common collector configuration and having their emitter electrodes connected together;

separate input means coupled to the base electrode of each of the transistors in the first and second gates;

a third emitter follower logic gate for performing the other one of the AND and OR logic functions, and including at least two transistors of the opposite conductivity type connected in the common collector configuration and having their emitter electrodes connected together;

means for coupling the output of the first logic gate to the base of one transistor in the third logic gate;

means for coupling the output of the second logic gate to the base of a second transistor in the third logic gate;

a current steering logic gate including at least two transistors having their emitters connected together;

a common emitter resistor for the transistors in said current steering gate;

separate collector impedances for the transistors in said current steering logic gate;

means coupling the output of the third gate to the base of one of the transistors in the current steering logic gate;

means for connecting the base of the other transistor in the current steering logic gate to a point of fixed potential; and output means connected at the collector of at least one of the transistors in the current steering logic gate.

5. The combination comprising:

at least first and second emitter follower logic gates each performing the same one of the AND and OR logic functions, each of said gates including a plurality of transistors of the same conductivity type connected in the common collector configuration and having their emitter electrodes connected together;

separate input means coupled to the base electrode of each of the transistors in the first and second gates;

a third emitter follower logic gate including at least two transistors of the opposite conductivity type connected in the common collector configuration and having their emitter electrodes connected together, said third gate performing the other one of the AND and OR logic functions;

means for coupling the output of the first logic gate to the base of one transistor in the third logic gate;

means for coupling the output of the second logic gate to the base of a second transistor in the third logic gate;

a fourth logic gate similar to said third logic gate;

a current steering logic gate including at least three transistors of said one conductivity type having their emitter electrodes connected together;

a common emitter resistor for said last-mentioned transistors;

means connecting the collectors of first and second ones of the transistors in said current steering logic gate together;

a common collector impedance for the last-mentioned first and second transistors;

a separate impedance connected to the collector of the third transistor in said current steering logic gate;

means for connecting the base of the third transistor to a point of fixed potential;

means for coupling the outputs of the third and fourth logic gates to the bases of the first and second transistors, respectively, in the current steering logic gate; and output means connected at the collector of at least one of the transistors of said current steering logic gate.

6. The combination comprising:

first and second emitter follower gates, each of said gates including a plurality of transistors connected in the common collector configuration and having their emitter electrodes connected together;

separate input means at the base of each transistor in the first and second logic gates;

a third emitter follower logic gate including a plurality of transistors connected in the common collector configuration and having their emitter electrodes connected together;

means coupling the outputs of the first and second logic gates to the base electrodes of different ones of the transistors in the third logic gate;

an emitter coupled current steering logic gate including at least first, second, and third transistors having their emitter electrodes connected together;

a common emitter resistor for the transistors in said current steering logic gate;

means for connecting the base of the first transistor of said current steering logic gate to a point of fixed potential;

impedance means connected in the collector circuit of said first transistor;

means connecting the collector electrodes of said second and third transistors together;

a second impedance element connected in common to the collectors of said second and third transistors;

level shift means connected between the output of the third logic gate and the base of one of said second and third transistors;

separate input means connected at the base of the other one of said second and third transistors; and output means connected at the collector of one of the transistors in the current steering logic gate.

7. The combination comprising:

first and second emitter follower gates, each of said gates including a plurality of transistors of one conductivity type connected in the common collector configuration and having their emitter electrodes connected together;

separate input means at the base of each transistor in the first and second logic gates;

a third emitter follower logic gate including a plurality of transistors of the opposite conductivity type connected in the common collector configuration and having their emitter electrodes connected together;

means coupling the outputs of the first and second logic gates to the base electrodes of different ones of the transistors in the third logic gate;

an emitter coupled current steering logic gate including at least first, second and third transistors of said one conductivity type having their emitter electrodes connected together;

a common emitter resistor for the transistors in said current steering logic gate;

means for connecting the base of the first transistor of said current steering logic gate to a point of fixed potential;

impedance means connected in the collector circuit of said first transistor;

means connecting the collector electrodes of said second and third transistors together;

a second impedance element connected in common to the collectors of said second and third transistors;

level shift means connected between the output of the third logic gate and the base of one of said second and third transistors;

separate input means connected at the base of the other one of said second and third transistors; and output means connected at the collector of one of the transistors in the current steering logic gate.

8. The combination comprising:

first and second emitter follower gates each including a plurality of transistors having their collector-emitter paths connected in parallel and being connected in the common collector configuration;

a separate emitter resistor for each of the first and second gates;

third and fourth logic gates each including at least two transistors having their base electrodes connected together and having their collector electrodes connected together;

separate resistors respectively connected in the common base circuits of the transistors in the third and fourth logic gates;

means coupling the common emitters of the first logic gate to the emitter electrode of one transistor in the third logic gate;

means coupling the common emitters of the second logic gate to the emitter electrode of a second transistor in the third logic gate;

an emitter coupled current steering logic gate including at least three transistors having their emitter electrodes connected together;

a resistor connected in common to the last-mentioned emitter electrodes;

means for connecting the base electrode of one transistor in the current steering logic gate to a point of fixed potential;

a first impedance element connected in the collector circuit of the last said one transistor;

means connecting the collectors of the other two transistors in said current steering logic gate together;

a second impedance element common to the collector electrodes of said other two transistors;

means for connecting the common collectors of the third logic gate to the base of one of said two other transistors in said current steering logic gate;

means connecting the collectors of the fourth logic gate to the base electrode of the other one of said two other transistors;

a third emitter follower logic gate including a plurality of transistors connected in the common collector configuration and having a common emitter resistor;

means for coupling the base electrode of one of the transistors in the third emitter follower gate to the collector of said one transistor of the current steering logic gate;

separate means for applying input signals at the base electrodes of the other transistors in the third emitter follower logic gate;

a fourth emitter follower logic gate including a number of transistors connected in the common collector configuration and having a common emitter resistor;

means for coupling the collectors of said two other transistors in the current steering logic gate to the base electrode and one of the transistors in the fourth emitter follower gate; and separate input means connected at the base electrodes of the remaining transistors in the fourth emitter follower logic gate.

9. The combination as claimed in claim 8 wherein all of the said transistors are of the same one conductivity type.

10. The combination as claimed in claim 8 wherein the first and second emitter follower logic gates perform the same one of the AND and OR logic functions, the third and fourth logic gates perform the other one of the AND and OR logic functions, the emitter coupled current steering logic gate performs the NOR and OR logic functions, and the third and fourth emitter follower logic gates perform the same logic function as the first and second emitter follower logic gates.

No references cited.

ARTHUR GAUSS, *Primary Examiner.*

ROBERT H. PLOTKIN, *Assistant Examiner.*

U.S. Cl. X.R.

307—218